United States Patent [19]

Akazawa et al.

[11] Patent Number: 5,144,641
[45] Date of Patent: Sep. 1, 1992

[54] SPREAD SPECTRUM COMMUNICATION DEVICE

[75] Inventors: Shigeo Akazawa; Yoshitaka Uchida, both of Tokyo, Japan

[73] Assignee: Clarion Co., Ltd., Tokyo, Japan

[21] Appl. No.: 654,077

[22] Filed: Feb. 11, 1991

[30] Foreign Application Priority Data

Feb. 15, 1990 [JP] Japan .................................... 2-34634

[51] Int. Cl.⁵ ............................................. H04K 1/00
[52] U.S. Cl. ...................................................... 375/1
[58] Field of Search ............................................ 375/1

[56] References Cited

U.S. PATENT DOCUMENTS

| | | |
|---|---|---|
| 4,875,221 | 10/1989 | Mori . |
| 4,943,975 | 7/1990 | Kurihara et al. . |
| 5,018,088 | 5/1991 | Higbie ................................ 375/1 |
| 5,022,047 | 6/1991 | Dixon et al. ........................ 375/1 |
| 5,023,887 | 6/1991 | Takeuchi et al. .................. 375/1 |
| 5,029,181 | 6/1991 | Endo et al. ......................... 375/1 |

Primary Examiner—Thomas H. Tarcza
Assistant Examiner—David Cain
Attorney, Agent, or Firm—Flynn, Thiel, Boutell & Tanis

[57] ABSTRACT

A multiplex communication device by the spread spectrum communication system is disclosed, in which a reference signal and a plurality of information signals are multiplexed to be transmitted after having spreading-modulated each of them, and data demodulation for the plurality of information signals is effected on the basis of a correlation-demodulated reference signal by executing correlation operation of this multiplexed received signal with a reference signal by means of a single correlator.

7 Claims, 12 Drawing Sheets

SPREAD SPECTRUM COMMUNICATION DEVICE

FIELD OF THE INVENTION

The present invention relates to an improvement of a multiplex communication device by a spread spectrum communication system using a single correlator in a receiver.

BACKGROUND OF THE INVENTION

FIGS. 10 and 11 show an example of the multiplex communication device by a prior art spread spectrum communication system executing high speed data communication.

FIG. 10 indicates the construction of a transmitter, in which reference numeral 1 is a serial-parallel converter; 2-1~2-n are multiplies; 3-1~3-n are PN code generators; 4-1~4-n are BPSK modulators; and 5 is an adder.

In the transmitter described above, inputted high speed data $S_1$ are converted into parallel data $S_21$, $S_22$, ..., $S_2n$ by the serial-parallel converter 1. Each of the parallel data sets $S_21$, $S_22$, ..., $S_2n$ is inputted in one input of each of the multipliers 2-1, 2-2, ..., 2-n. On the other hand, each of PN codes $S_31$, $S_32$, ..., $S_3n$ different each other outputted by each of the PN code generators 3-1, 3-2, ..., 3-n is inputted in the other input of each of the multipliers 2-1, 2-2, ..., 2-n. Outputs $S_41$, $S_42$, ..., $S_4n$ of the multipliers 2-1, 2-2, ..., 2-n are inputted in the BPSK modulators 4-1, 4-2, ..., 4-n, respectively, to modulate an RF carrier signal $S_5$ In this way, RF signals $S_61$, $S_62$, ..., $S_6n$ are outputted by the BPSK modulators 4-1, 4-2, ..., 4-n, respectively, which RF signals are inputted in the adder 5. An n-multiplexed spread spectrum signal $S_7$ is outputted by the adder 5 to be transmitted.

FIG. 11 indicates the construction of the receiver, in which 7-1~7-n are convolvers; 8-1~8-n are multipliers; 9-1 - 9-n are PN code generators; 10-1~10-n are detectors; and 12 is a data demodulator.

In the receiver described above, a received signal $S_9$ is divided into a plurality of signals, each of which is inputted in one input of each of the convolvers 7-1, 7-2, ..., 7-n.

On the other hand, the PN code $S_{10}1$, $S_{10}2$, ... $S_{10}n$ outputted by each of the PN code generator 9-1, 9-2, ... 9-n is applied to one input of each of the multipliers 8-1, 8-2, ..., 8-n. An RF carrier signal $S_{13}$ is inputted in the other inputs of the multipliers 8-1, 8-2, ..., 8-n. The output $S_{11}1$, $S_{11}2$, ..., $S_{11}n$ of each of the multipliers 8-1, 8-2, ..., 8-n is applied to one input of each of the convolvers 7-1, 7-2, ..., 7-n.

The outputs $S_{12}1$, $S_{12}2$, ..., $S_{12}n$ of the convolvers are inputted in the detectors 10-1, 10-2, ..., 10-n, respectively. At this time, as indicated in FIG. 12, in the outputs of the convolvers correlation spikes are produced with a same timing for different data channels. The outputs $S_{15}1$, $S_{15}2$, ..., $S_{15}n$ of the detectors 10-1, 10-2, ..., 10-n are inputted in the data demodulator 12. Demodulated data $S_{16}$ are outputted by the data demodulator 12.

The prior are multiplex communication device described above has drawbacks that it is necessary to synchronize the carriers and that a plurality of convolvers (or matched filters) serving as correlators are required.

OBJECT OF THE INVENTION

Therefore, the object of the present invention is to remove the drawback of the prior art multiplex communication device that a plurality of correlators are required and to provide a multiplex communication device, in which demodulation is effected by means of a single correlator.

SUMMARY OF THE INVENTION

A spread spectrum communication device according to the present invention is characterized in that it is provided with a transmitter comprises serial-parallel converting means for converting serial data into a plurality of parallel data sets; first PN code generating means for generating at least a first PN code, responding to a PN clock; spreading modulating means, in which the plurality of parallel data sets are inputted and which outputs the first PN code in the form of a plurality of modulated data sets, responding to different data sets; delaying means for outputting the plurality of modulated data sets, while delaying them in time; and RF modulating means for RF-modulating each of the plurality of delayed modulated data sets and synthesizing a signal to be transmitted by combining them.

The present invention includes further a spread spectrum communication device provided with a receiver comprising second PN code generating means for generating a third PN code, which is in a relation inverted in time with respect to a PN code included in a received signal, responding to a PN clock; reference signal generating means for generating a reference signal, based on the third PN code; a correlator for correlating the received signal with the reference signal; converting means for converting a correlation output of the correlator into a binary signal; sampling means for sampling the binary signal on the basis of a sampling signal generated for every predetermined period of time and converting it into a plurality of parallel data sets; and data demodulating means for taking-in the plurality of parallel data sets with a predetermined timing and demodulating them into serial data.

In the multiplex communication device constructed as described above the transmitter transmits the reference signal (signal in the state where the PN code is not modulated with data, e.g. "all 1", called sounder) and the information signals (data) combined together. On the receiver side inputted high spread data are serial-parallel converted, which are spreading-modulated for every channel. The modulated signals thus obtained are delayed one after another for every channel e.g. with reference to the sounder. An RF carrier signal is modulated with each of the delayed signals and a signal is synthesized by combining signals thus obtained to be transmitted.

On the receiver side correlation is taken by means of a single correlator for a received signal. The PN code used as the reference signal for the correlator is so selected that a correlation spike is outputted, e.g. when the data represent "1". Concerning the correlator, contrarily to the prior art method, e.g. at the head a correlation spike due to the sounder is outputted and subsequently correlation spikes of the delayed data channels are outputted serially.

DETAILED DESCRIPTION

Figure 1:
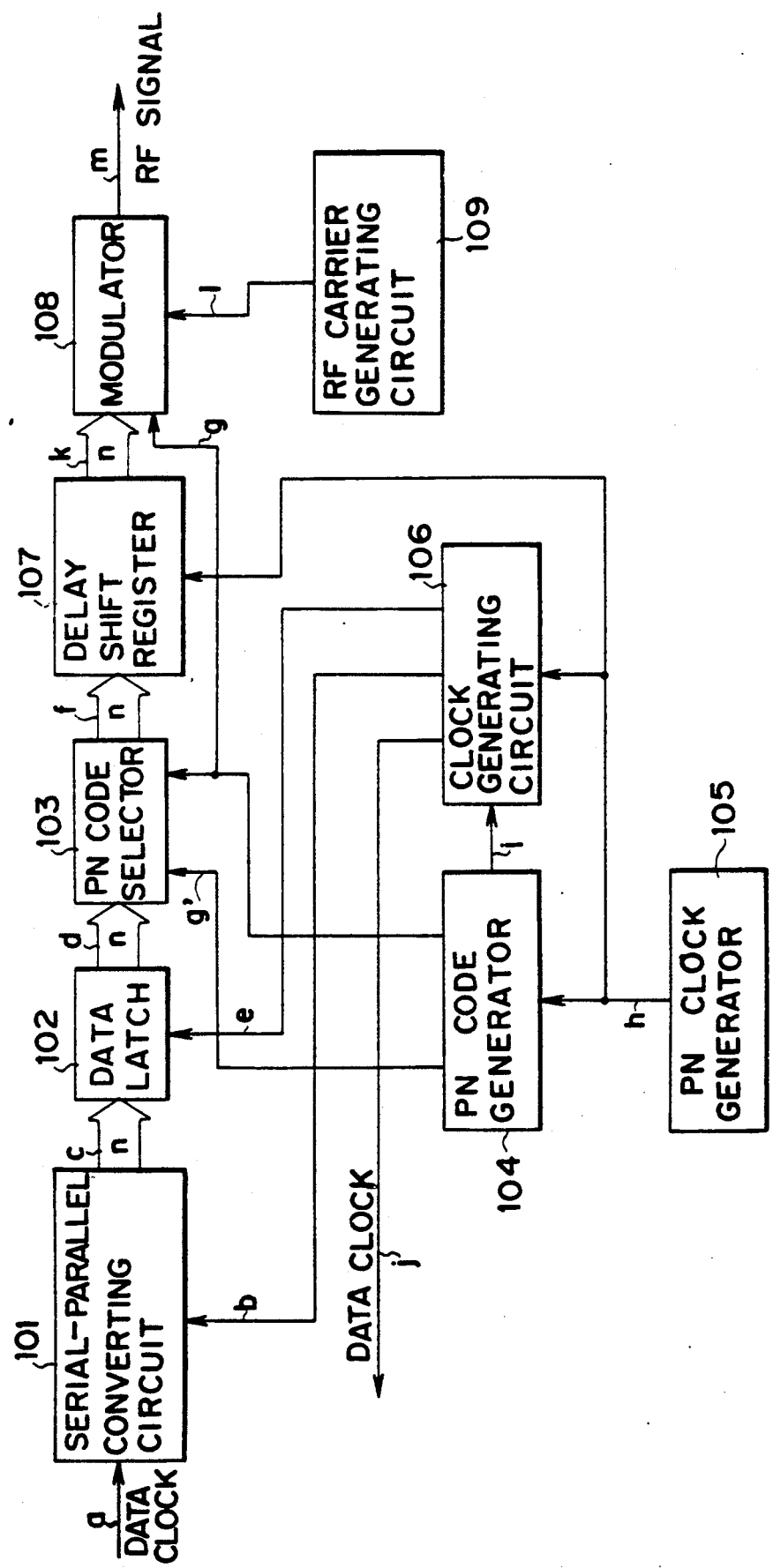
FIG. 1 is a block diagram showing the construction of a transmitter, which is an embodiment of the present invention.
Figure 2:
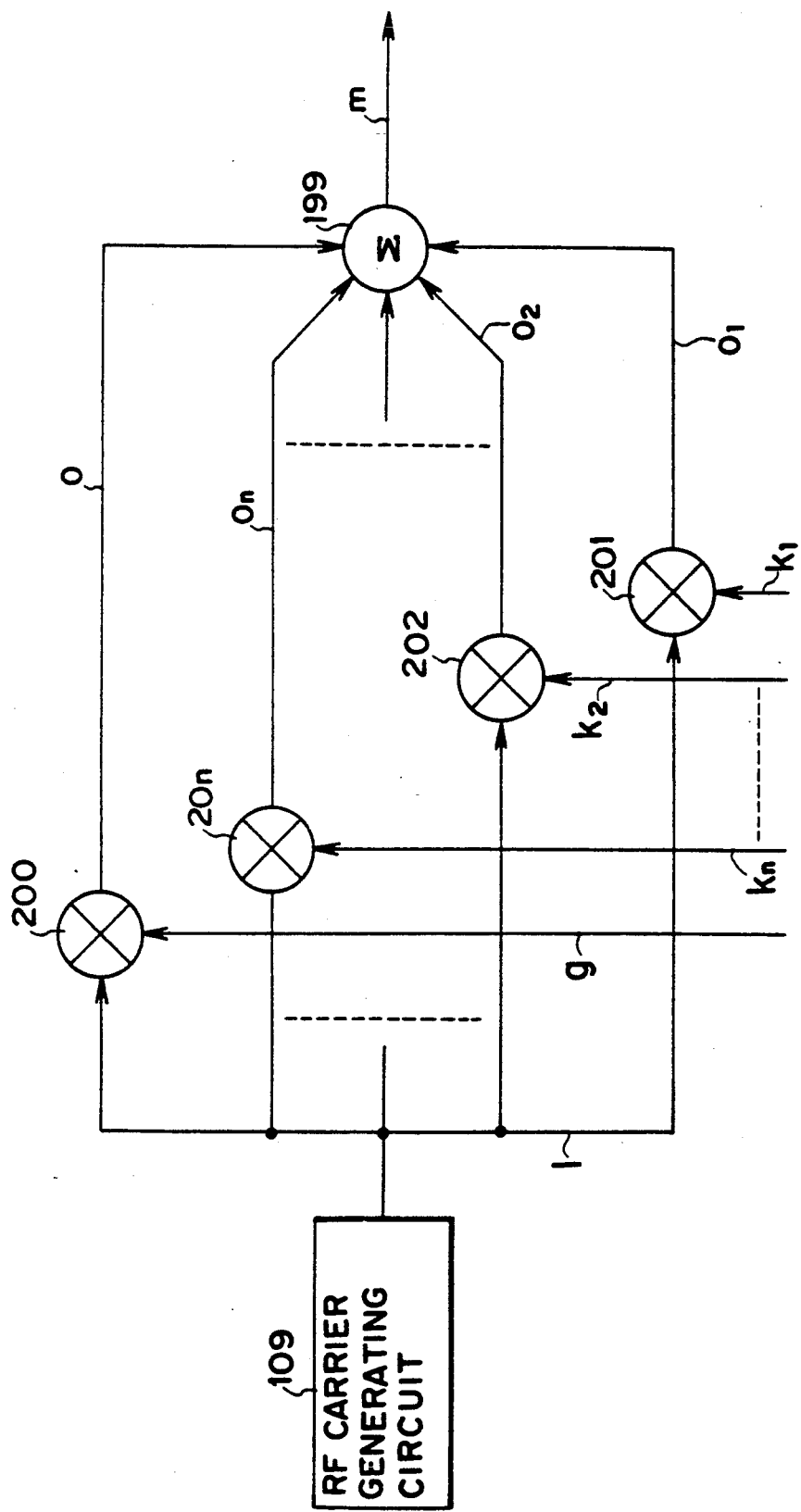
FIG. 2 is a block diagram indicating an example of the construction of a modulator.
Figure 3:
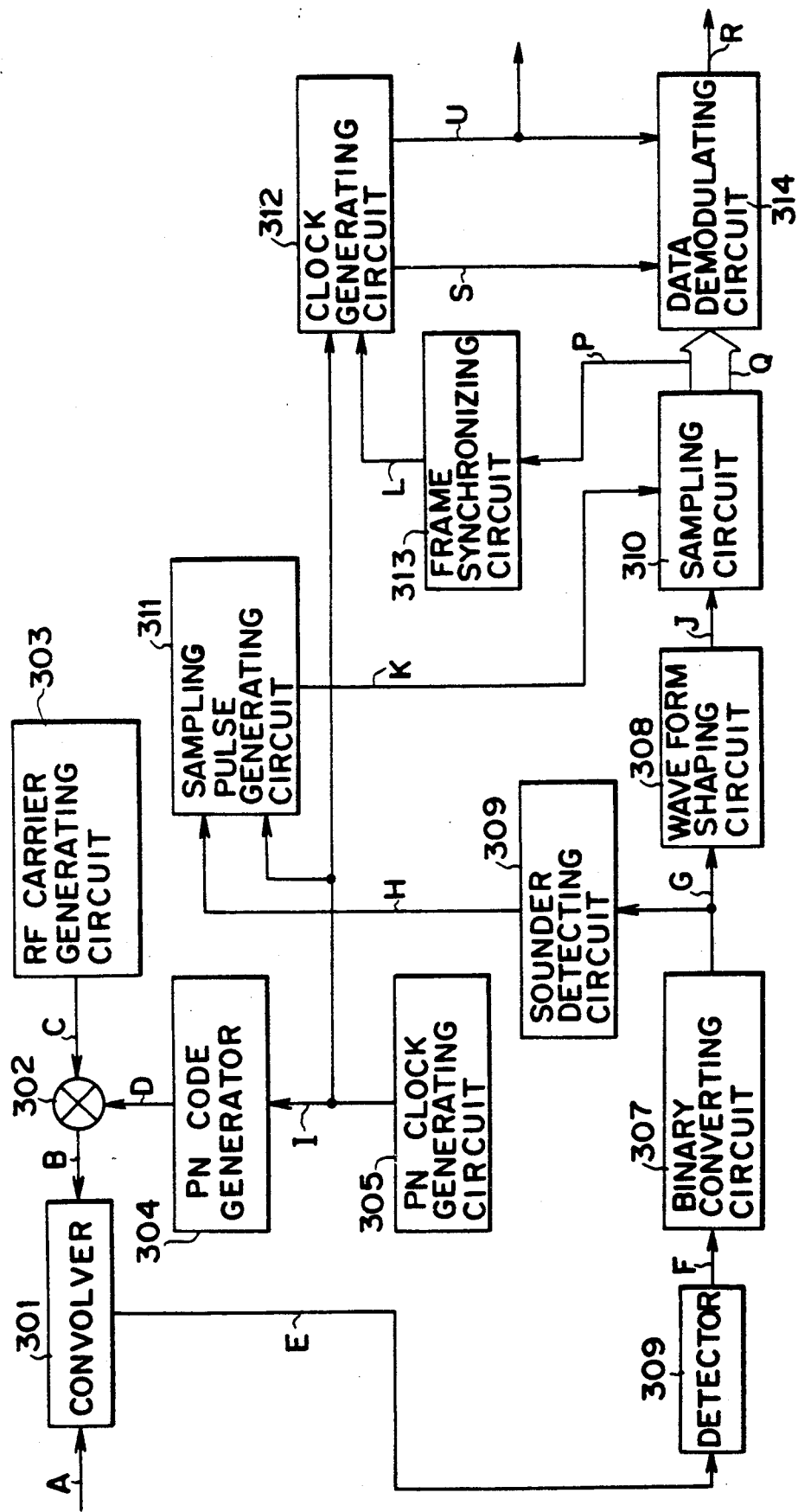
FIG. 3 is a block diagram showing the construction of a receiver, which is an embodiment of the present invention.

Hereinbelow the present invention will be explained, referring to the embodiments indicated in the drawings. FIGS. 1, 2 and 3 show a transmitter, a modulator and a receiver, respectively, constituting an embodiment of the M channel multiplex communication device according to the present invention.

As indicated in FIG. 1, the transmitter is composed of a serial-parallel converting circuit 101, data latches 102, PN code selectors (CSK modulators) 103, delay shift registers 107, a modulator 108, a PN code generator 104, a PN clock generator 105, a clock generating circuit 106 and an RF carrier generator 109.

The modulator 108 is composed of a plurality of multipliers 200~20n and an adder 199, as indicated e.g. in FIG. 2.

The receiver is composed of a convolver 301, which is the correlator, a multiplier 302, an RF carrier generator 303, a PN code generator 304, a PN clock generator 305, a detector 306, a binary converting circuit 307, a waveform shaping circuit 308, a sounder pulse detecting circuit 309, a sampling pulse generating circuit 311, a clock generating circuit 312, a sampling circuit 310, a frame synchronizing circuit 313, and a data demodulating circuit 314, as indicated in FIG. 3.

Now the operation of the embodiment described above will be explained. Inputted data a is converted into signals of n channels by the serial-parallel converting circuit 101. Here it is supposed that M=n+1. The serial-parallel converting circuit samples the data by using a sampling clock b outputted by the clock generating circuit 106. Parallel data c of n channels, which are the output of the serial-parallel converting circuit 101, are inputted in the data latches 102. The data latches 102 latch the parallel data c by using a latch clock e outputted by the clock generating circuit 106. The output d of each of the data latches 102 is applied to one input of each of the PN code selectors (CSK modulator) 103. Further two sorts of PN codes g and g' outputted by the PN code generator 104 are inputted in the other input of each of the PN code selectors 103.

The PN code and the modulated parallel data f are inputted in the delay shift registers 107. The delay shift registers 107 perform shift by using a PN clock h outputted by the PN clock generator 105. The output k of the delay shift register 107 is inputted in the modulator 108. Further the PN code g is inputted also in the modulator 108 as the reference signal. An RF carrier 1 outputted by the RF carrier generator 109 is inputted in the other input of the modulator 108. In the modulator 108 indicated in FIG. 2, the RF carrier 1 outputted by the RF carrier generator 109 is divided into (n+1) multiplexed data sets, each of which is 20 inputted in one input of each of the multipliers 200~20n. The PN code g is also inputted in one input of the multiplier 200 as the reference channel (sounder). Each of delayed data sets k is inputted in the other input of each of the multipliers 200~20n. An RF signal to be transmitted m is synthesized by combining the outputs 0, $0_1 \sim 0_n$ of the multipliers by the adder 199 to be transmitted.

A PN clock h outputted by the PN clock generating circuit 105 is inputted in the PN code generator 104 and two sorts of PN codes g and g' and a start bit i are outputted by the PN code generating circuit 104. On the other hand, the PN clock h and the start bit i are inputted in the clock generating circuit 106. The data clock j, the data sampling pulse b and the latch clock e are outputted by the clock generating circuit 106.

This will be explained more in detail, referring to the timing charts.

Figure 4:
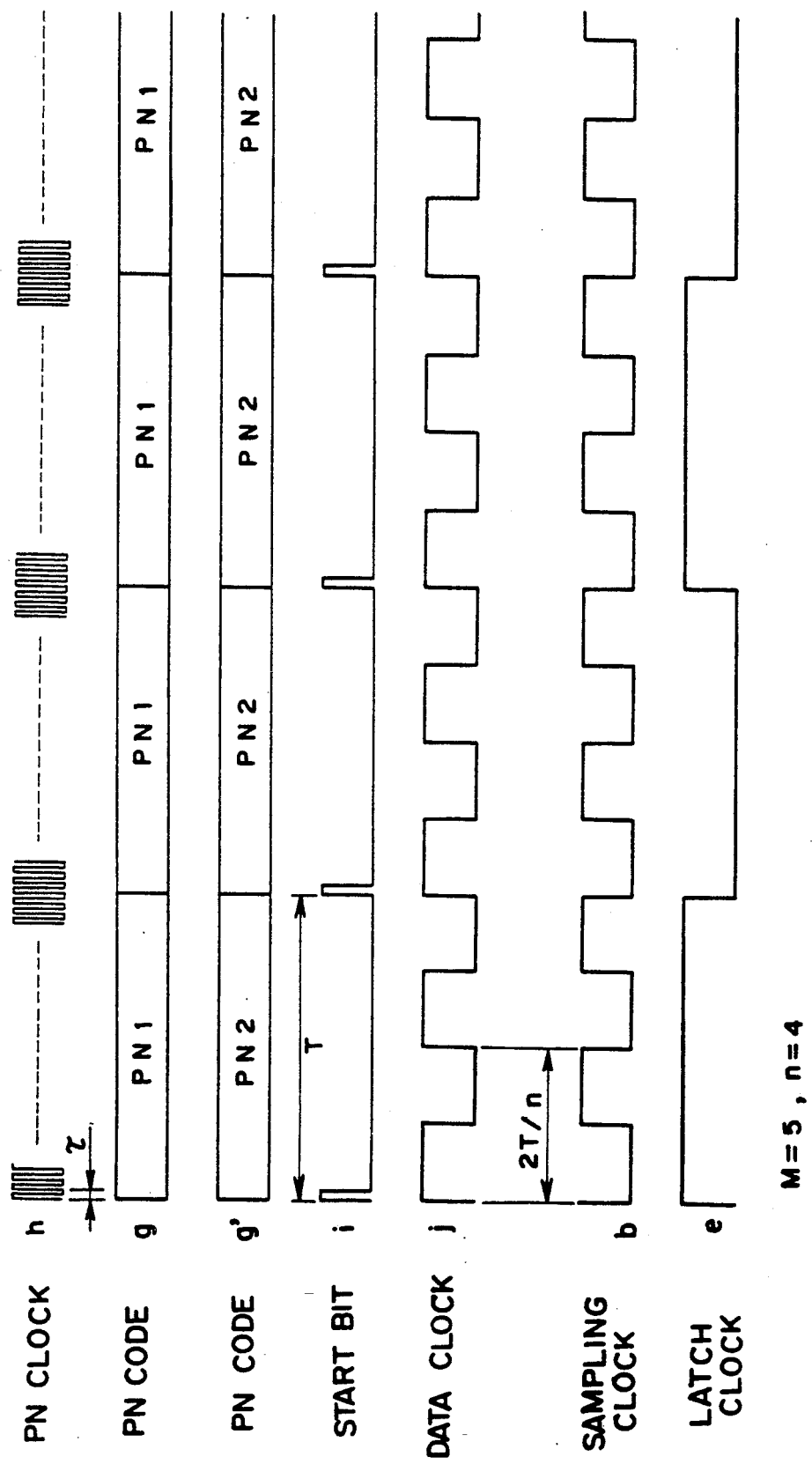
FIG. 4, 5 and 6 are timing charts for explaining the operation of the embodiments described above.
Figure 6:
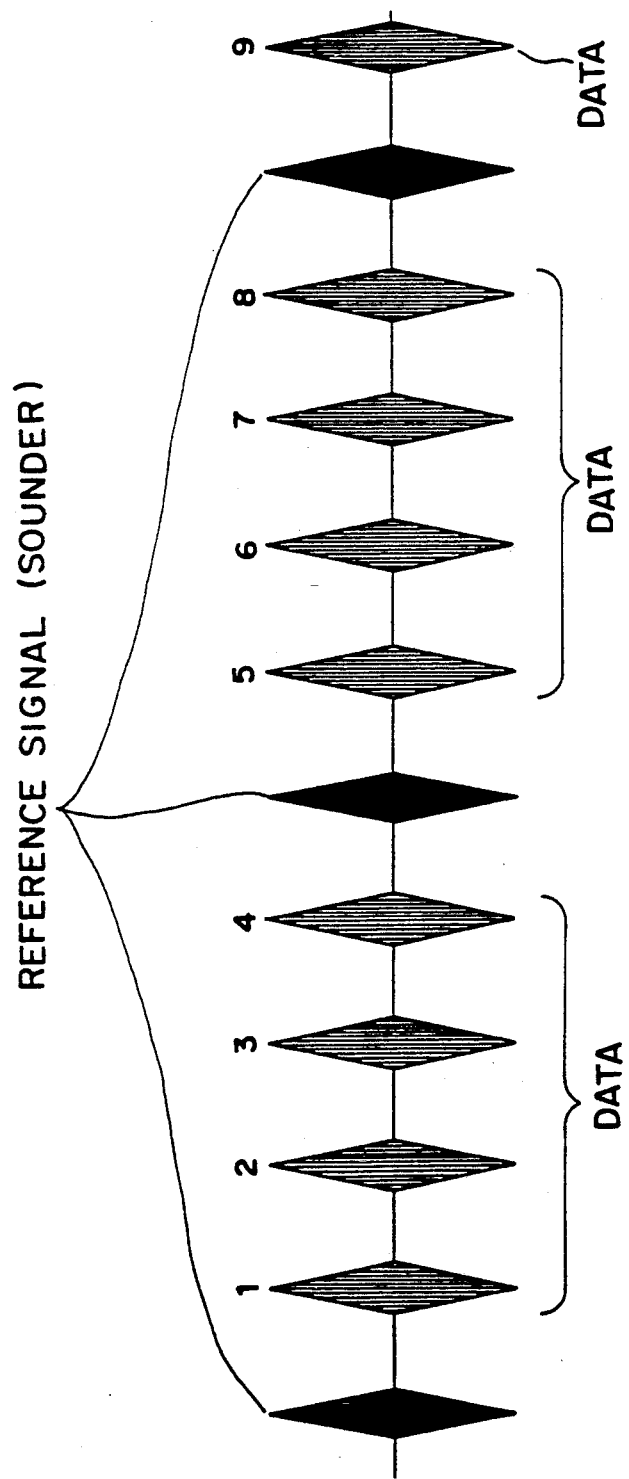

FIG. 4 shows the relation among the different clocks. Now it is supposed that the multiplex number n of the data is 4 and a case of a 5 wave multiplex (M=5) including the sounder, as indicated in FIG. 6, is considered. Denoting the length of the PN code by N, the period of the PN clock by $\tau$ and the period of the PN code by T, $$T = N \cdot \tau \ldots \quad (1)$$

is valid.

Starting from the starting bit i outputted by the PN code generator 104 with the same timing as the starting bits of the PN code g and g', the data clock j, the sampling clock b and the latch clock e are outputted by the clock generating circuit 106, as indicated in FIG. 4.

Figure 5:
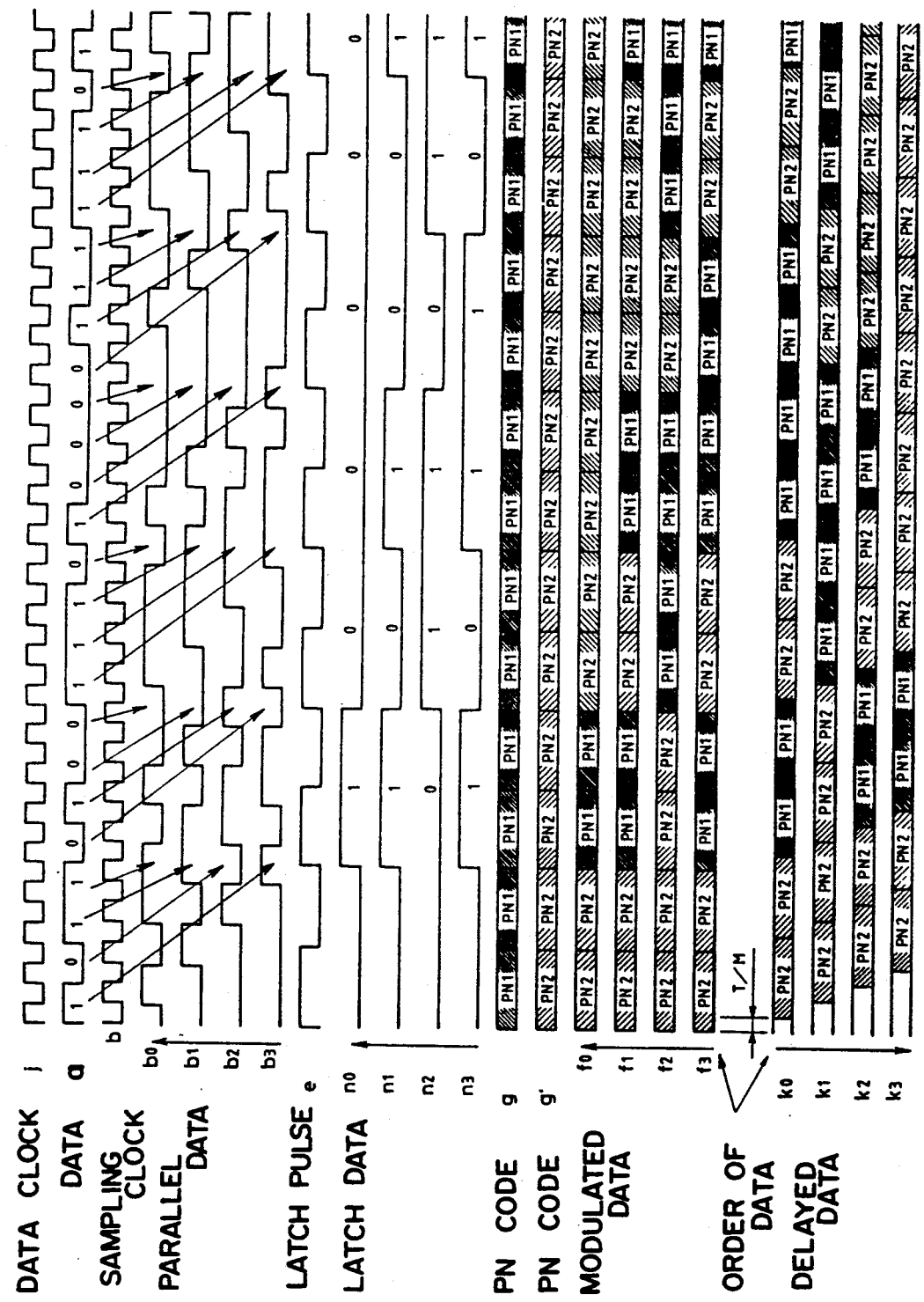

FIG. 5 shows other timing.

In the transmitter the data a are inputted in synchronism with the data clock. The data a are converted into parallel data $C_0 \sim C_3$ of 4 bits by means of the serial-parallel converter 101 by using the sampling clock b having an opposite phase with respect to the data clock j.

The parallel data are latched with the latch clock e having a period (2T), which is twice as long as that of the PN code. In this way, the data for each channel are assigned to two period of the PN code. The latched data are arranged in the order of $n_3, n_2, n_1, n_0$, as indicated in the figure.

These latched data n are spreading-modulated by selecting the PN code g or g' by means of the PN code selector (CSK modulator) 103 according to the data. At this time, when the data represent "1", the PN code g (PN1) is selected. In this way the modulated data f are obtained, in which the data are modulated with the PN code.

The modulated data f are inputted in the shift registers 107 having different numbers of stages and delayed, as indicated by delayed data $k_0 \sim k_3$ in the figure. Here the latched data $n_0$ correspond to the delayed data $k_3$; the latched data $n_1$ to the delayed data $k_2$; the latched data $n_2$ to the delayed data $k_1$; and the latched data $n_3$ to the delayed data $k_0$. The delay time t is given by;

$$t = \phi \cdot \tau \ldots \quad (2)$$

where $\phi$ represents the greatest integer in N/M.

The sounder channel (e.g. data, in which all the bits are "1" and PN code g: PN1 for all) and these delayed data k are inputted in the modulator 108 and multiplied by the RF carrier signal 1 by means of the multiplier 201~204, respectively. RF signals 0, $0_1$, $0_4$, which are outputs thereof, are added to each other by the adder 199 to obtain a synthesized signal, which is to be transmitted.

At this time, the relative phase of the carrier, by which the delayed data k is multiplied, is not necessarily in a relation, by which they are perpendicular to each other, but they may have a same phase at the input of the adder 199.

On the other hand, in the receiver, a multiplexed spread spectrum signal A is received, which is applied to one input of the convolver 301. In the other input of the convolver a reference signal B is inputted, which is obtained by multiplying the PN code D outputted by the PN code generator 304 by the RF carrier signal C outputted by the RF carrier generating circuit. Here PN code D is in the minor image relation on the time axis with respect to the PN code g (PNl) of the received signal.

In the convolver 301 convolution is taken between the received signal A and the reference signal B and an RF correlation signal E is outputted. FIG. 6 shows an example of the correlation signal E. The correlation signal E is converted into a binary signal by the binary converting circuit 307 after having been detected by the detector 306. A binary converted correlation pulse G is shaped in the waveform by the waveform shaping circuit 308. A waveform shaped digital signal J is sampled by the sampling circuit 310.

On the other hand, the correlation pulse G is inputted in the sounder detecting circuit 309 and when the sounder is detected, a detection pulse H is outputted. The detection pulse H is inputted in the sampling pulse generating circuit 311, which generates a sampling pulse K.

The sampling circuit 310 obtains necessary data by sampling the digital signal J by using the sampling pulse K and converts them into parallel data Q.

Data P of one channel in the parallel data Q are inputted in the frame synchronizing circuit 313. The frame synchronizing circuit detects the beginning of data and when it detects the starting point, it outputs a start pulse L.

This start pulse L and the PN clock 1 are inputted in the clock generating circuit 312, which outputs a store pulse S for the data demodulation. When this pulse is inputted in the data demodulating circuit 314, the data demodulating circuit 314 begins the data demodulation. Further a data clock U for transmitting data is inputted from the clock generating circuit 312 to the data demodulating circuit 314, which transmits data R synchronized therewith.

Although, in the present invention, a convolver serving as a correlator is cited as an example, a matched filter may be used as the correlator.

Figure 7:
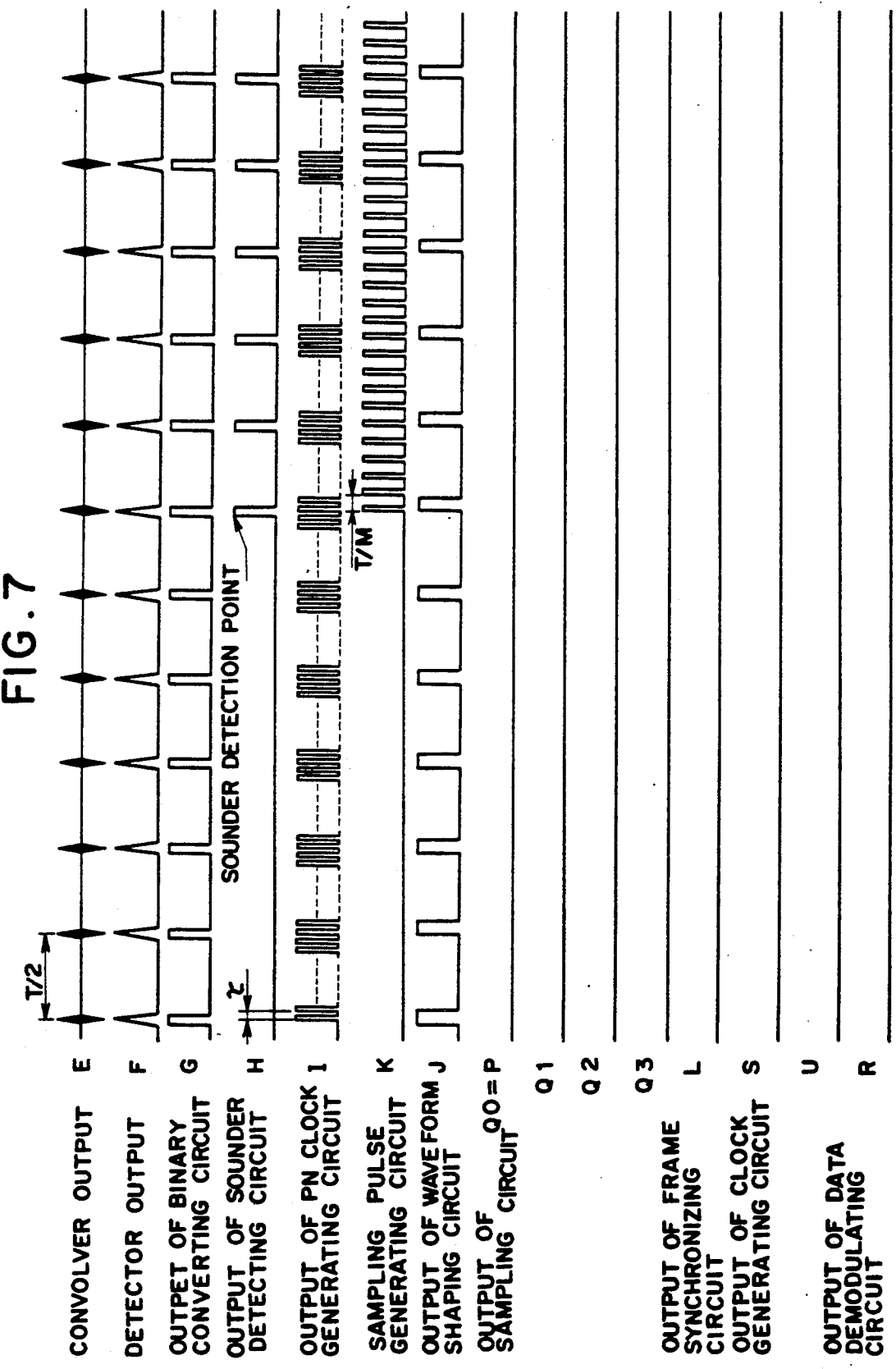
FIGS. 7, 8 and 9 are timing charts more in detail of the embodiments described above.
Figure 8:
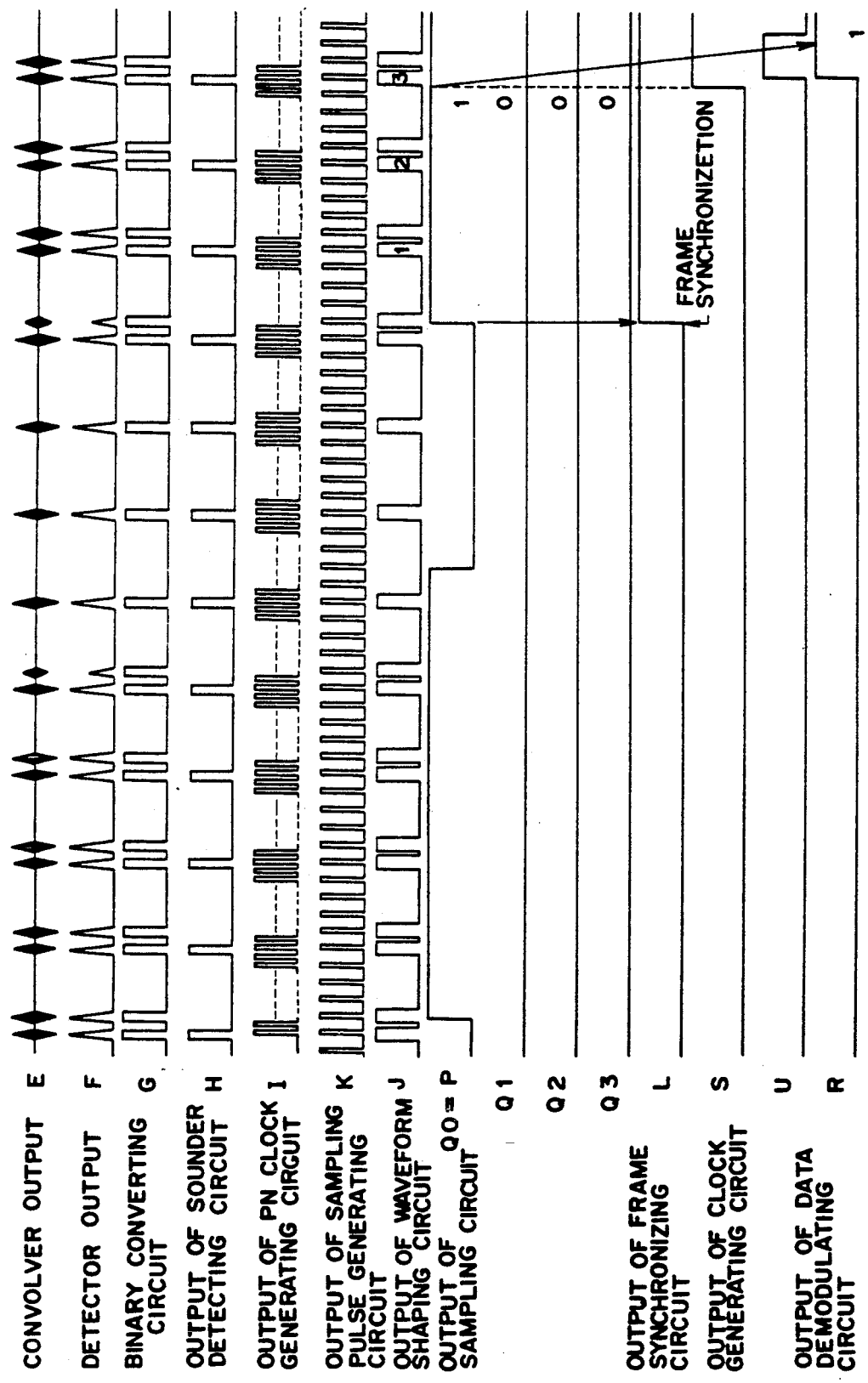
Figure 9:
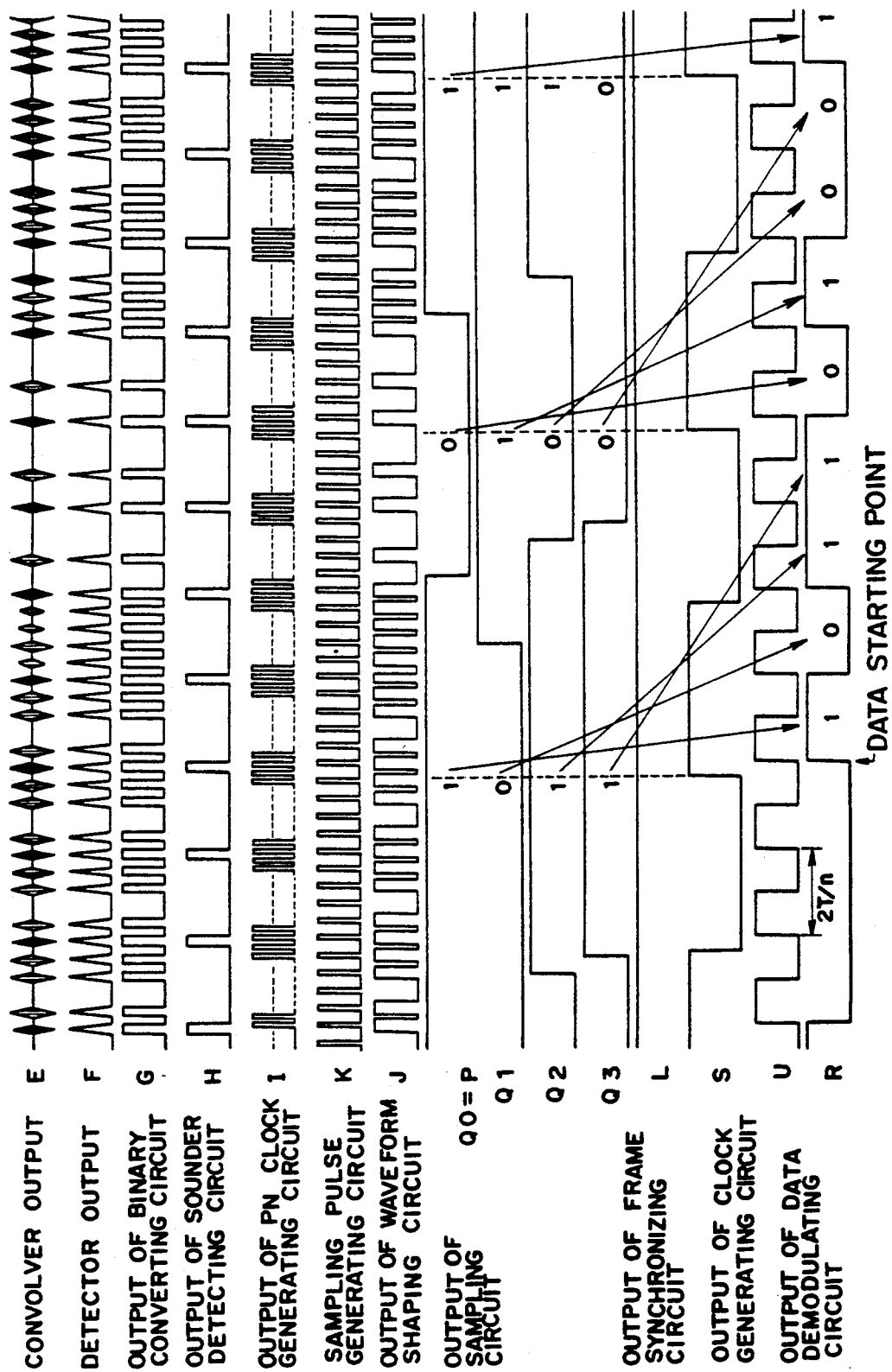
Figure 10:
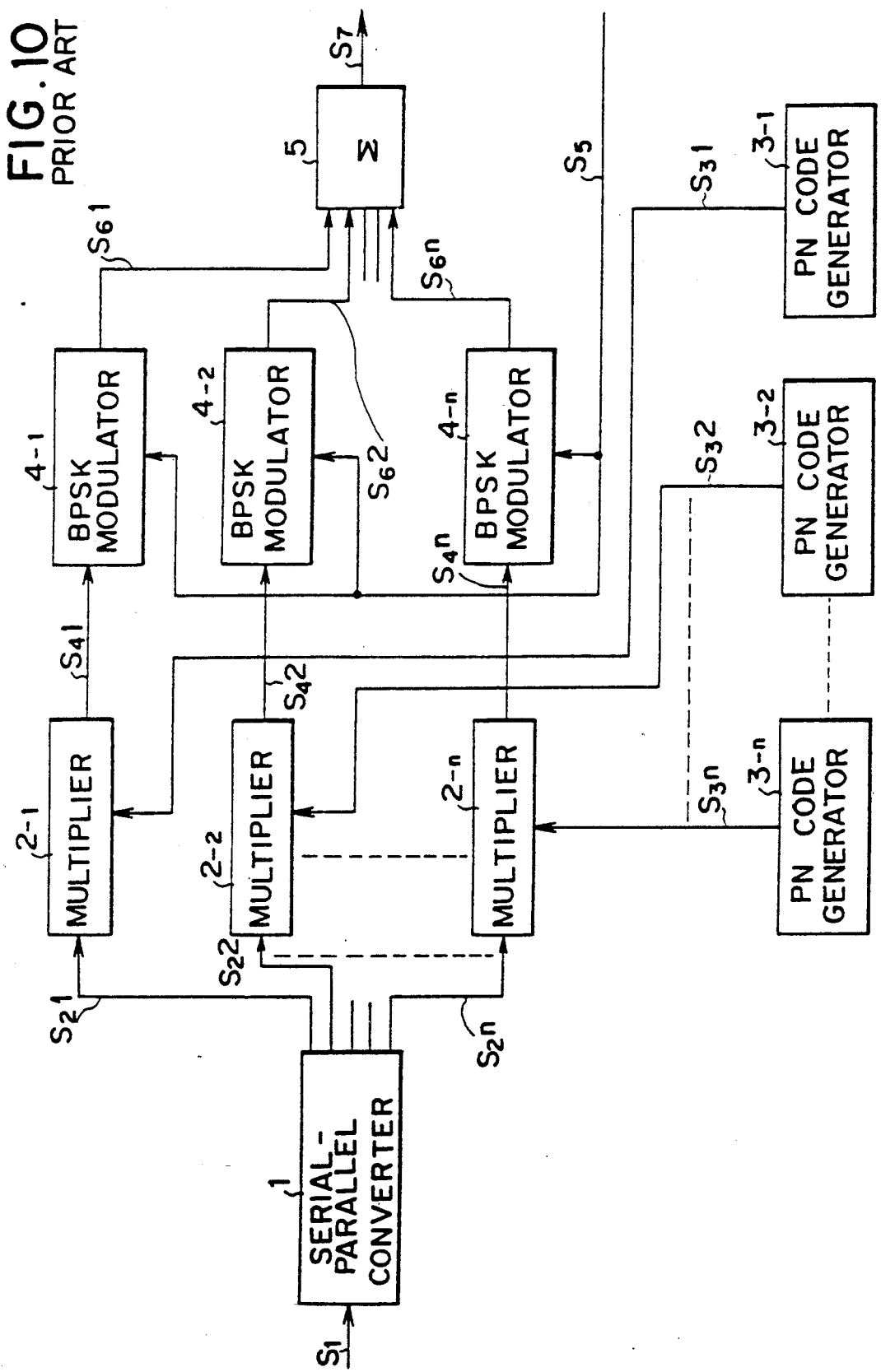
FIGS. 10 and 11 are block diagrams indicating an example of the prior art device.
Figure 11:
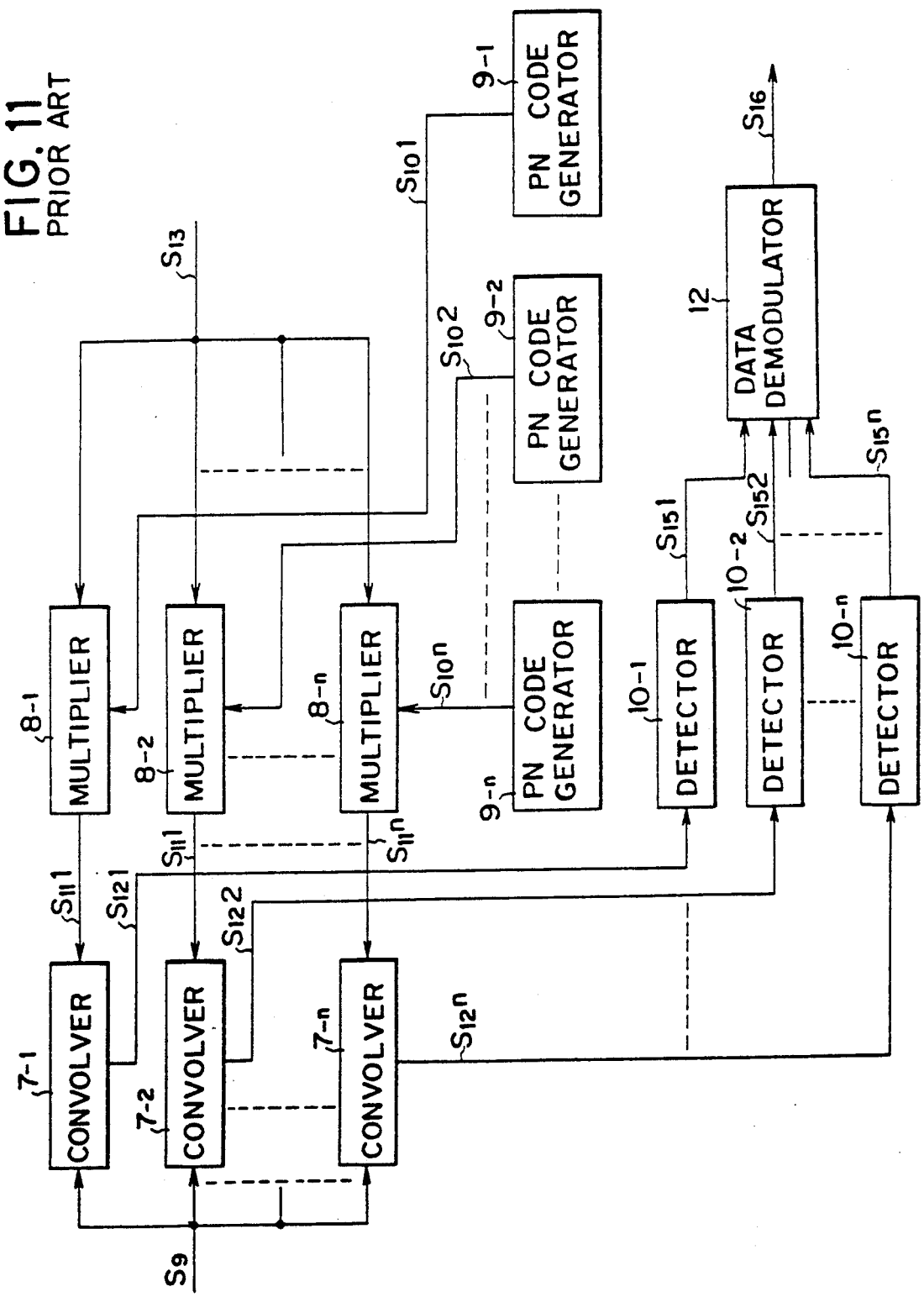
Figure 12:
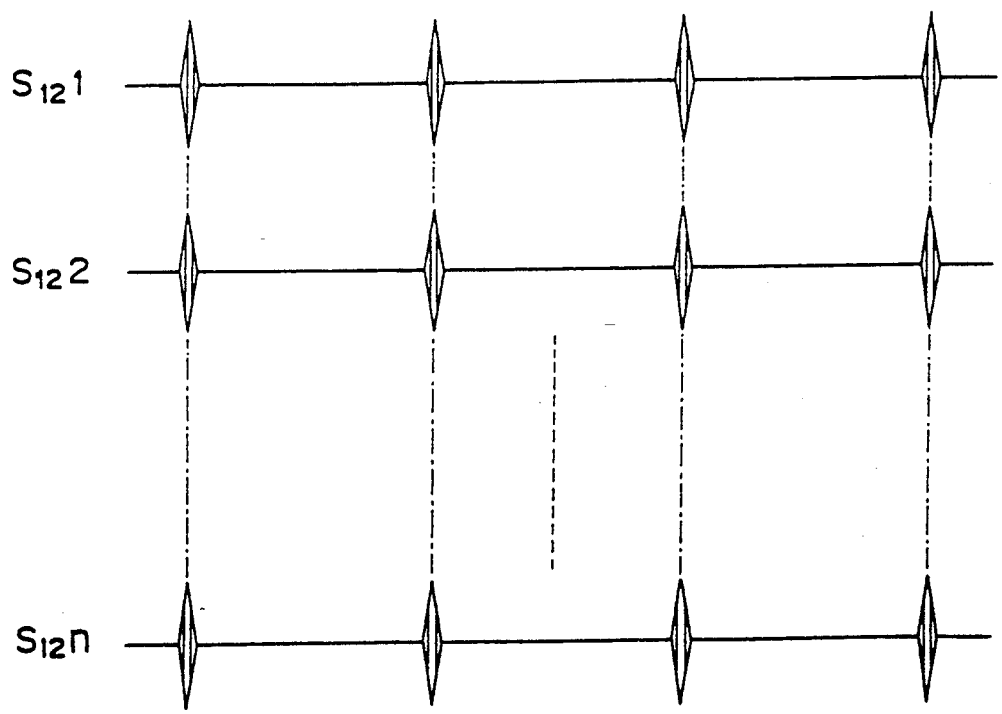
FIG. 12 is a scheme showing the correlation signal in FIG. 11.

FIGS. 7, 8 and 9 show a concrete example of the operation in the embodiment described above in detail, supposing that, on the transmitter side, data

"000000000000"

are transmitted at the beginning for the detection of the sounder; subsequently data

"100000001000"

are transmitted for the synchronization of the frame; and thereafter data

"101101001110"

are transmitted.

FIG. 7 indicates the process, until the sounder is detected. On the transmitter side, at first, only the sounder is transmitted, before the data are transmitted. When it is received, a signal E as indicated in the figure is outputted by the convolver 301. This is detected and converted into a digital signal as indicated by G by the binary converting circuit. This signal is inputted in the sounder detecting circuit 309, which outputs a sounder detection signal H, when a sounder pulse having a period of T/2 is detected. When this sounder detection signal is inputted in the sampling pulse generating circuit 311, it outputs a sampling pulse K by the PN clock 1.

On the other hand, binary converted digital data G are inputted also in the waveform shaping circuit 308, in which the pulse width thereof is increased. When the sounder is detected and the sampling pulse is generated, then the frame synchronization is performed. This process is indicated in FIG. 8.

On the transmitter side, determined pattern data for the frame synchronization are transmitted only to channel 1 after having transmitted only the sounder for a certain period of time.

When this pattern is detected by the frame synchronizing circuit 313, a detection signal L is outputted. When this signal is inputted in the clock generating circuit 312, a clock S having a period of 2T synchronized with the rising edge of the third sounder pulse is outputted. Almost at the same time as the process described above the parallel data are parallel-serial-converted by the data demodulating circuit by using these clocks, which circuit outputs the data R.

When the frame synchronization is performed, the data are demodulated and issued by the receiver. This aspect is indicated in FIG. 9.

The continuous digital signal J is sampled by the sampling pulse K and converted into parallel data Q (Q0~Q3). The data demodulating circuit 314 takes-in the parallel data Q by using the rising edge of the demodulation clock S and outputs the demodulated data R with the timing of a data clock U.

As explained above, according to the present invention, even when the multiplexed spread spectrum communication is effected, one correlator is sufficient and therefore the circuit can be simplified.

Although, in the case where a convolver or a matched filter is used as the correlator, the upper limit of the transmission rate for data, which can be dealt with, is determined by the processing time of the convolver, it is possible to effect high speed data transmission exceeding the limit.

In addition, since it is not necessary to raise the speed of the clock of the PN code, even when high speed data transmission is effected, the communication frequency band is not broadened and no interference on other communication systems takes place.

What is claimed is;

1. A spread spectrum communication device provided with a transmitter comprising:
   serial-parallel converting means for converting serial data into a plurality of parallel data sets;

first PN code generating means for generating at least a first PN code in response to a PN clock;

spreading modulating means, in which said plurality of parallel data sets are inputted and which outputs said first PN code in the form of a plurality of modulated data sets corresponding to respective said parallel data sets;

delaying means for outputting said plurality of modulated data sets, while delaying them in time; and RF modulating means for RF-modulating each of said plurality of delayed modulated data sets and synthesizing a signal to be transmitted by combining them.

2. A spread spectrum communication device according to claim 1, wherein in said transmitter said first PN code generating means generates said first PN code and a second PN code in response to a PN clock, and said spreading modulating means outputs selectively said first or second PN code in response to each of said plurality of parallel data sets.

3. A spread spectrum communication device provided with a receiver comprising:

PN code generating means for generating in response to a PN clock a first PN code, which is identical to but inverted in time with respect to a second PN code included in a received signal;

reference signal generating means for generating a reference signal based on said first PN code;

a correlator for correlating said receiving signal with said reference signal;

converting means for converting a correlation output of said correlator into a binary signal;

sampling means for sampling said binary signal on the basis of a sampling signal generated for every predetermined period of time and converting said binary signal into a plurality of parallel data sets; and data demodulating means for taking-in said plurality of parallel data sets with a predetermined timing and demodulating them into serial data.

4. A spread spectrum communication device according to claim 3, wherein said reference signal generating means RF-modulates said first PN code to obtain said reference signal.

5. A spread spectrum communication device according to claim 1, provided with a receiver comprising:

second PN code generating means for generating in response to a PN clock a third PN code, which is identical to but inverted in time with respect to a PN code included in a received signal;

reference signal generating means for generating a reference signal based on said third PN code;

a correlator for correlating said received signal with said reference signal;

converting means for converting a correlation output of said correlator into a binary signal;

sampling means for sampling said binary signal on the basis of a sampling signal generated for every predetermined period of time and converting said binary signal into a plurality of parallel data sets; and data demodulating means for taking-in said plurality of parallel data sets from said sampling means with a predetermined timing and demodulating them into serial data.

6. A spread spectrum communication device according to claim 2, provided with a receiver comprising:

second PN code generating means for generating in response to a PN clock a third PN code, which is identical to but inverted in time with respect to a PN code included in a received signal;

reference signal generating means for generating a reference signal based on said third PN code;

a correlator for correlating said received signal with said reference signal;

converting means for converting a correlation output of said correlator into a binary signal;

sampling means for sampling said binary signal on the basis of a sampling signal generated for every predetermined period of time and converting said binary signal into a plurality of parallel data sets; and data demodulating means for taking-in said plurality of parallel data sets from said sampling means with a predetermined timing and demodulating them into serial data.

7. A spread spectrum communication device according to claim 21, wherein said RF modulating means includes a plurality of multipliers, to at least one of the other multipliers being given said RF carrier and a respective one of said delayed modulated data sets.

* * * * *

UNITED STATES PATENT AND TRADEMARK OFFICE
CERTIFICATE OF CORRECTION

PATENT NO. : 5 144 641

DATED : September 1, 1992

INVENTOR(S) : Shigeo AKAZAWA et al

It is certified that error appears in the above-identified patent and that said Letters Patent is hereby corrected as shown below:

Column 8, line 42; change "21" to ---2---.

Signed and Sealed this

Twenty-sixth Day of October, 1993

Attest:

BRUCE LEHMAN

Attesting Officer      Commissioner of Patents and Trademarks